ASTABLE MULTIVIBRATOR HAVING MEANS TO ADJUST THE OUTPUT MAGNITUDE AND FREQUENCY

Filed Jan. 23, 1962

INVENTOR.
STEPHEN MALUDA
BY
Eyre, Mann & Lucas
ATTORNEYS 3,202,935

ASTABLE MULTIVIBRATOR HAVING MEANS TO ADJUST THE OUTPUT MAGNITUDE AND FREQUENCY

Stephen Maluda, Clifton, N.J., assignor to Tung-Sol Electric Inc., a corporation of Delaware Filed Jan. 23, 1962, Ser. No. 168,082
1 Claim. (Cl. 331—109)

The present invention comprises a novel astable multivibrator that requires a minimum number of components, has good frequency stability, and has sawtooth and square wave voltage outputs.

The new circuit utilizes resistors, capacitors and, in one embodiment, a single semiconductor device, specifically a gated four zone semiconductor device such as a 2N1968. An RC network is connected between one end zone, hereinafter called the emitter, and one terminal of the source. Current through the resistor, when the device conducts, brings the potential at the emitter to cut-off value, and discharge of the condenser through the resistor after cut-off restores the emitter potential to a value to permit restoration of conduction. The gate of th four zone device is connected, by way of a potential divider, to a point of potential which places the device in condition for conduction. The other end zone, hereinafter called the collector, is connected through a resistor to the other terminal of the source. Square wave voltage output appears at the collector and a sawtooth voltage wave appears at the emitter during oscillation of the circuit.

A second embodiment, in addition to the above mentioned structure, employs two diodes between the gate excitation and the gate to limit the voltage across the RC network to predetermined levels as the oscillating cycle progresses. This provides an output which is more stable in frequency.

Figure 1:
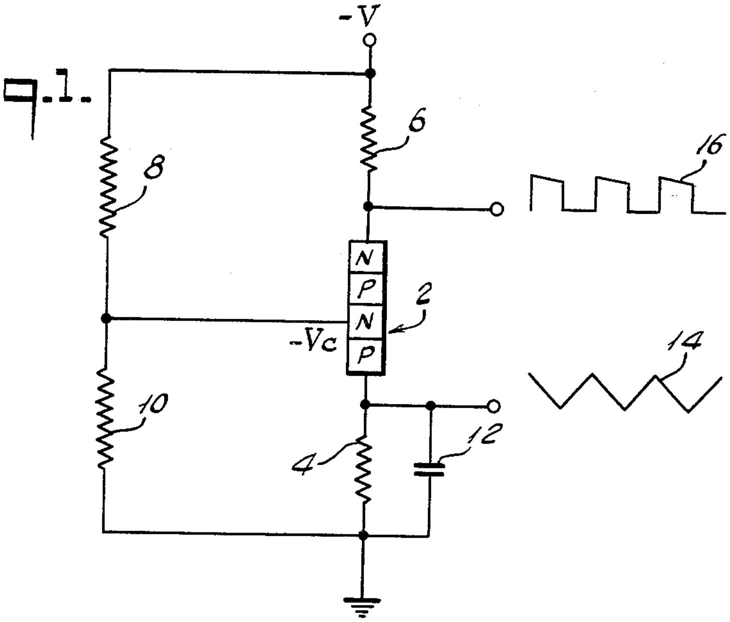
Figure 2:
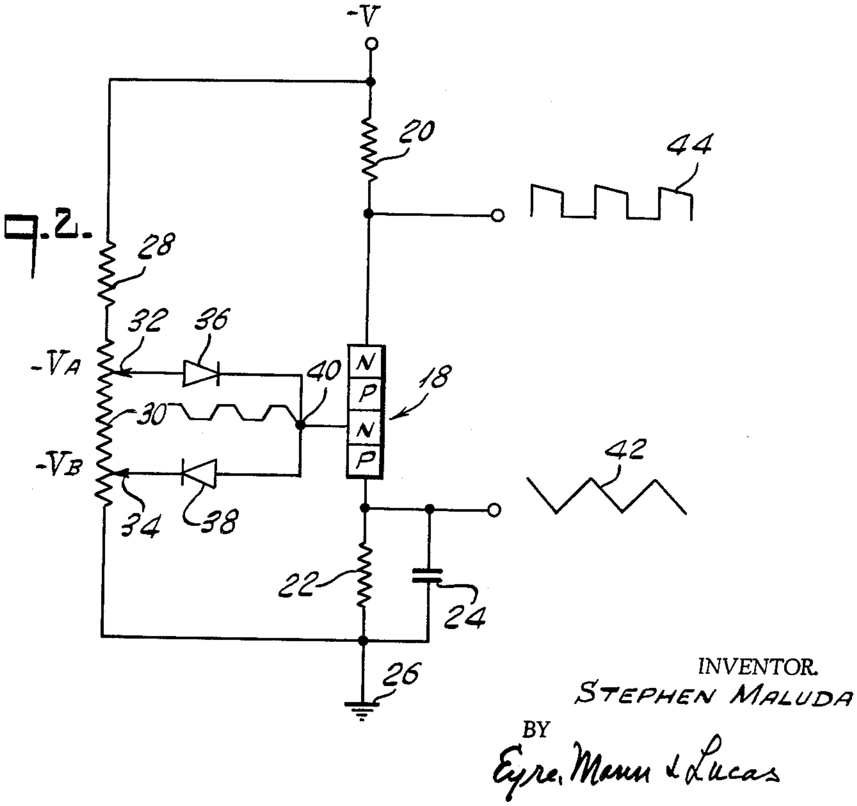

For a better understanding of the invention and of specific embodiments thereof, reference may be had to the accompanying drawing, of which:

FIG. 1 is a circuit of an astable multivibrator representing one embodiment of the invention; and FIG. 2 is a circuit diagram of an astable multivibrator representing a second embodiment of the invention.

Referring to FIG. 1, an N-gated PNPN semiconductor 2 is shown in block form with its emitter, the end P zone, connected to ground through a resistor 4 and its end N zone, the collector, connected to a source of negative potential, —V, through a resistor 6. A pair of resistors, 8 and 10, are connected in series between the source of negative potential, —V and ground, and the junction of resistors 8 and 10 is connected to the inner N-zone, or gate, of device 2. A capacitor 12 is connected across resistor 4. Resistor 10 is larger than resistor 4 but substantially smaller than resistor 8. The voltage of the source, —V, may be, for example, 12 volts.

With the above described circuit, before the source is connected, the emitter of device 2 is, of course, at ground potential. When the source is connected a negative potential, $-V_c$, appears at the gate due to current flow through the potential divider comprising resistors 8 and 10. This negative potential is sufficient to turn on the device causing current to flow through the device and resistors 4 and 6. This flow through resistor 4 charges the capacitor 12 which makes the potential at the emitter increasingly more negative. As the potential at the emitter becomes more negative, the current through the semiconductor 2 decreases due to the lowering of the potential across the device 2 and finally falls below the sustaining current, turning off the device. This cuts off the charging of the capacitor 12 through the device 2. Whereupon the capacitor 12 discharges through resistor 4 returning the emitter potential to ground allowing the device 2 to be turned on again by the negative potential $-V_c$ at the gate to start another cycle. Thus the circuit continues to oscillate at a frequency determined by the magnitudes of resistors 4 and 6 and capacitor 12. During oscillation a sawtooth voltage, such as diagrammed at 14, appears at the emitter, and a square wave voltage, diagrammed at 16, appears at the collector.

A second embodiment of the invention is shown in FIG. 2. Here, as in FIG. 1, an N-gated PNPN semiconductor 18 is connected in series with two resistors across a source of potential. The first of these resistors, the collector resistor 20, is connected between the negative terminal of the power supply, —V, and the collector, and the second resistor, the emitter resistor 22, is connected in parallel with a capacitor 24, between ground 26, and the emitter. A pair of series connected resistors 28 and 30 are connected across the power source. Resistor 30 is provided with a pair of electrically conductive taps 32 and 34 which are slidably movable along the resistor. The taps are joined by a pair of diodes 36 and 38, connected front to back, with the anode of diode 36 connected to tap 32 and the cathode of diode 38 connected to tap 34. The common point 40 between the diodes is connected to the gate, the inner N zone, of the semiconductor device.

In operation, before the voltage —V is applied to the circuit, the gate will be at ground potential by virtue of conduction of diode 36. When current passes through resistors 28 and 30 to ground causing diode 38 to conduct to bring the voltage at the gate of the semiconductor 18 to $-V_b$. With this excitation on the gate, the semiconductor device conducts. With conduction the resistance of the emitter-gate diode is low and therefore the potential at the gate will follow that at the emitter. When the emitter potential, and therefore the gate potential, reaches $-V_a$, diode 36 conducts, limiting the negative potential to this value and also limiting the charge on capacitor 24 and causing the current through the device to fall below the sustaining value. This arrangement limiting the charge on the capacitor 24 makes the circuit more stable and because the charge on capacitor 24 is controlled by the diode circuits, the output frequency will depend, in part, upon the location of the taps on resistor 30. In any oscillating circuit having a capacity the magnitude of the capacity, the level when it starts to discharge and the level when it starts to charge all affect the frequency of the circuit. As the position of the taps 32 and 34 determine these levels, they thus affect the frequency. This circuit has more stable output frequency characteristics then the circuit of FIGURE 1 and compensates for variations in components. This is because the circuit in FIGURE 2 can be separately adjusted for optimum high and low voltage limits on capacitor 24 by movement of the taps 32 and 34 along resistor 30. As in the circuit shown in FIG. 1, the circuit produces a sawtooth and a square wave output. The sawtooth output is indicated by the numeral 42 and the numeral 44 indicates the square wave output.

The invention has now been described with reference to two embodiments thereof employing an N-gated four zone semiconductor device. Obviously, by reversal of polarities, a P-gated device could equally well be employed in the circuits. Other variations within the scope of the accompanying claim will occur to those skilled in the art.

The following is claimed:

An astable multivibrator comprising a gated four zone semiconductor device having a gating terminal and emitter and collector terminals, a source of direct current energy having two terminals, a first resistor and capacitor connected in parallel between one terminal of said source of direct current energy and said emitter terminal of said four zone semiconductor device, a second resistor connected in series between said other terminal of said source of direct current energy and the collector of the four zone semiconductor device, a voltage dividing means connected across said two terminals of the source of direct current energy in parallel with the first and second resistors, the capacitor, and the emitter-collector path of the four zone device and having a point intermediate the ends thereof coupled to the gating terminal of the four zone semiconductor device to bias the gate with respect to the emitter so as to turn on the four zone semiconductor device when the potential at the emitter is at the potential of said one terminal of the source but insufficient to maintain conduction of the device when the potential at the emitter is changed from that of said one terminal of said source by charging of the capacitor to some other level of potential thereby causing the capacitor to alternately charge and discharge, producing saw-tooth waves across the capacitor and square waves across the second resistor, wherein said voltage dividing means comprising a resistor connected between the two terminals of said source, two diodes connected front to back in series between two electrically conductive points on said resistor and connected at their common point to the gating terminal of said four zone semiconductor device so as to provide two different levels of bias to the gating terminal.

References Cited by the Examiner

UNITED STATES PATENTS

| | | | |
|---|---|---|---|
| 2,672,550 | 3/54 | Leighton | 331—129 |
| 2,864,062 | 12/58 | Schaffner | 331—115 X |
| 2,890,353 | 6/59 | Van Overbeek et al. | 331—111 X |

FOREIGN PATENTS

| | | |
|---|---|---|
| 1,093,821 | 12/60 | Germany. |

OTHER REFERENCES

Notes on the Application of the Silicon Controlled Rectifier, pages 36–39, December 1958, by G.E. Co.

"Dynaquad" Tung-Sol Semiconductor Div., presented at IRE meeting March 17, 1961, No. T475, 12 pages.

Solid State Product, Inc., Bulletin, D420–02, August 1959, pages 11–12.

Article by Vollheim in IBM Technical Disclosure Bulletin, vol. 4, No. 7, December 1961.

ROY LAKE, *Primary Examiner.*

JOHN KOMINSKI, *Examiner.*